United States Patent
Sawai et al.

[11] Patent Number: 6,057,979
[45] Date of Patent: May 2, 2000

[54] MAGNETIC TAPE CASSETTE WITH FAIL-SAFE INSERTING APPARATUS

[75] Inventors: Kunio Sawai; Hiroshi Hamahata; Shigeru Kaneko; Katsunori Onishi, all of Osaka, Japan

[73] Assignee: Funai Electric Co., Ltd., Osaka, Japan

[21] Appl. No.: 08/964,254

[22] Filed: Nov. 4, 1997

[30] Foreign Application Priority Data

Nov. 6, 1996 [JP] Japan ................................. 8-293557

[51] Int. Cl.[7] ............................................. G11B 15/00
[52] U.S. Cl. ................................................. 360/96.5
[58] Field of Search ............................. 360/96.5, 96.6; 242/338, 338.4

[56] References Cited

U.S. PATENT DOCUMENTS

| | | | |
|---|---|---|---|
| 4,866,551 | 9/1989 | Kishimoto et al. | 360/96.5 |
| 5,034,830 | 7/1991 | Lee | 360/85 |
| 5,371,641 | 12/1994 | Kim | 360/96.5 |
| 5,394,282 | 2/1995 | Wada | 360/96.5 |

FOREIGN PATENT DOCUMENTS

| | | |
|---|---|---|
| 59-151354 | 8/1984 | Japan . |
| 59-191167 | 10/1984 | Japan . |
| 63-50967 | 3/1988 | Japan . |

Primary Examiner—David D. Davis
Attorney, Agent, or Firm—Lackenbach Siegel Marzullo Aronson & Greenspan

[57] ABSTRACT

A magnetic tape apparatus having a bearer formed so as to be reciprocatable in the front-rear direction between a cassette insertion position and a cassette mount position on a chassis for inserting a tape cassette, and a rotating cam provided on the chassis for driving the bearer through an interlocking mechanism with a clutch. In the magnetic tape apparatus, the clutch is turned off to release the interlocking mechanism between the bearer and the rotating cam when the bearer is advanced from the cassette mount position to the cassette insertion position, while the clutch is turned on to establish the interlock between the bearer and the rotating cam when the bearer is retreated from the cassette insertion position to the cassette mount position.

3 Claims, 6 Drawing Sheets

MAGNETIC TAPE CASSETTE WITH FAIL-SAFE INSERTING APPARATUS

BACKGROUND OF THE INVENTION

1. Field of the Invention

The present invention relates to a magnetic tape apparatus in which not only a tape cassette can be inserted easily, but also there is no fear that interior parts are damaged even if the insertion is performed in the off-state of the power supply.

2. Description of the Related Art

As an example of such a magnetic tape apparatus, conventionally, there is one in which a bearer for inserting a tape cassette is formed so as to be reciprocatable in the front-rear direction between the cassette insertion position and the cassette mount position on a chassis, and a rotating cam for driving the bearer through an interlocking mechanism is provided on the chassis.

In the above-mentioned configuration, when a tape cassette is inserted to the bearer which is on standby in the cassette insertion position, the rotating cam is rotated forward in response to a detection signal detecting the insertion of the tape cassette, so that the bearer with the tape cassette inserted thereon is retreated to the cassette mount position through the interlocking mechanism.

Next, upon depression of a tape cassette ejecting button, the rotating cam is rotated backward in response to an ejecting signal generated from the tape cassette ejecting button, and the bearer with the tape cassette inserted thereon is advanced to the cassette insertion position through the interlocking mechanism, so that the tape cassette can be taken out.

In the above-mentioned conventional configuration, the bearer and the rotating cam are interlocked integrally with each other through the interlocking mechanism, so that it is necessary to insert the tape cassette with a comparatively large force against a spring built in the interlocking mechanism. As a result, the feeling is not good.

In addition, when the tape cassette is forcibly inserted in the off-state of the power supply, there is a fear that interior parts engaging with the interlocking mechanism receives an excessive load and thus may be damaged due to a large insertion force.

SUMMARY OF THE INVENTION

In view of the foregoing disadvantages of conventional magnetic tape apparatuses, it is an object of the present invention to provide and improved magnetic tape apparatus in which not only a tape cassette can be inserted easily, but also there is no fear that interior may be damaged even if the insertion is performed in the off-state of the power supply.

In order to achieve the above object, the present invention provides a magnetic tape apparatus comprising: a bearer formed so as to be reciprocatable in a front-rear direction between a cassette insertion position and a cassette mount position on a chassis for inserting a tape cassette; and a rotating cam provided on the chassis for driving the bearer through an interlocking mechanism with a clutch, wherein the clutch is turned off to release the interlocking mechanism between the bearer and the rotating cam when the bearer is advanced from the cassette mount position to the cassette insertion position, while the clutch is turned on to establish an interlock between the bearer and the rotating cam when the bearer is retreated from the cassette insertion position to the cassette mount position.

BRIEF DESCRIPTION OF THE DRAWINGS

FIG. 7 is a plan view of a main part illustrating the state where the clutch is turned on.

DETAILED DESCRIPTION OF THE PREFERRED EMBODIMENT

Figure 1:
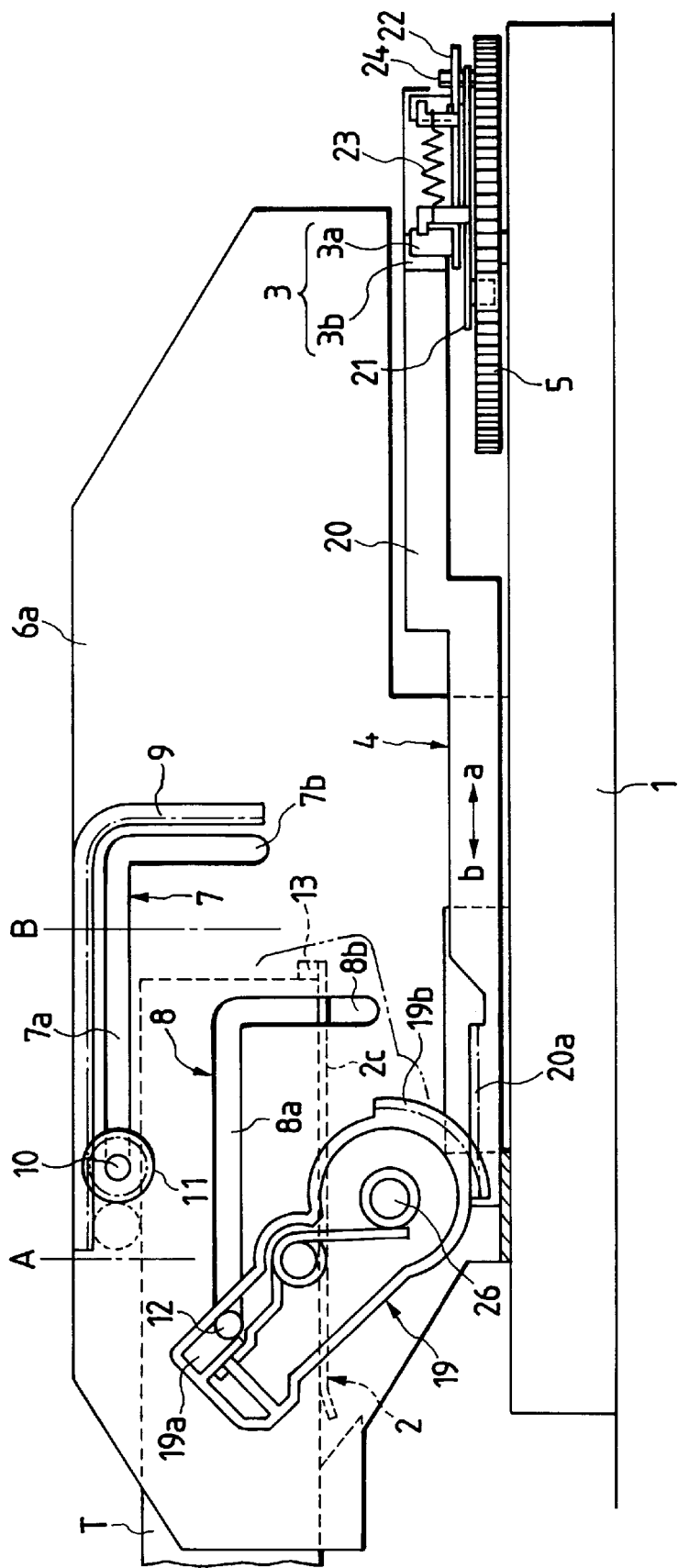
FIG. 1 is a side view illustrating a magnetic tape apparatus as an embodiment of the present invention.

The present invention will be described below in detail with reference to the drawings. FIGS. 1 to 4 show a magnetic tape apparatus as an embodiment of the invention. In these figures, a bearer 2 for inserting a tape cassette T is formed so as to be reciprocatable in the front-rear direction between a cassette insertion position A and a cassette mount position B on a chassis 1, and a rotating cam 5 for driving the bearer 2 through an interlocking mechanism 4 with a clutch 3 is provided on the chassis 1.

A pair of right and left guide plates 6a and 6b are provided so as to erect at the opposite side edges of the chassis 1. A pair of upper and lower substantially L-shaped guide holes 7 and 8 are formed between the cassette insertion position A and the cassette mount position B in the respective guide plates 6a and 6b. A rack 9 is formed into a substantial L-shape along the upper guide hole 7. In addition, a tape cassette guide rod 6c and an interlocking rod 6d are laid between the both guide plates 6a and 6b.

The bearer 2 is disposed between the both guide plates 6a and 6b. The opposite end portions of a guide rod 10 penetrating the upper end portions of opposite side wall portions 2a and 2b of the bearer 2 rotatably are inserted into the upper guide holes 7 movably. Pinions 11 fixed to the opposite end portions of the guide rod 10 are geared with the racks 9, while guide pins 12 provided so as to project at the center portions of the opposite side wall portions 2a and 2b are inserted into the lower guide holes 8 movably. In addition, a tape cassette stopper 13 is provided so as to project at the rear end of a bottom wall portion 2c of the bearer 2.

Figure 5:
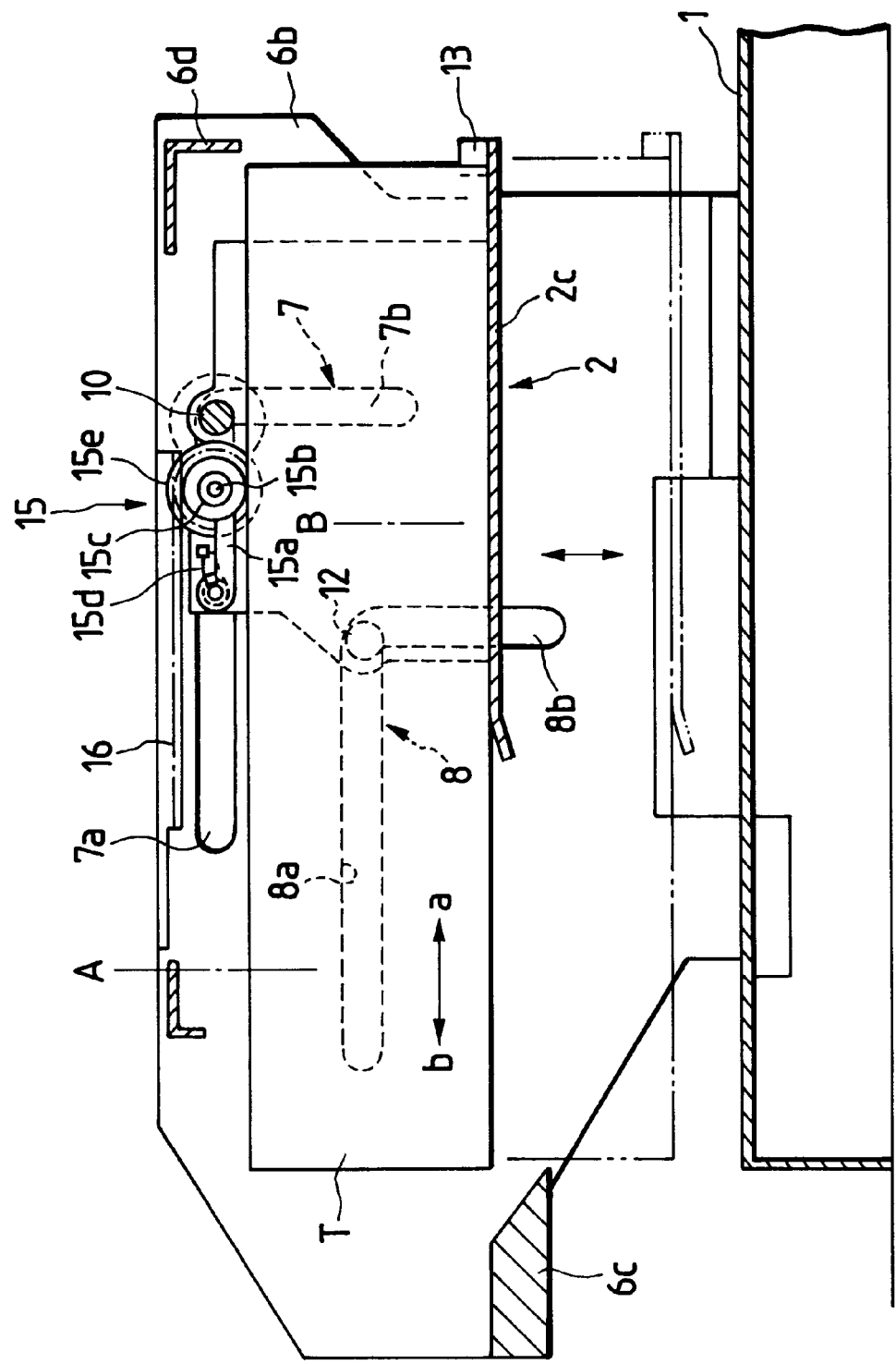
FIG. 5 is a longitudinal sectional view illustrating the state where a bearer is retreated.

In the above-mentioned configuration, as shown in FIG. 1, when the tape cassette T is inserted to the bearer 2 which is on standby in the cassette insertion position A, the forward end of the tape cassette T hits on the stopper 13, so that the bearer 2 with the tape cassette T inserted thereon can be retreated in the direction of the arrow a to the cassette mount position B along the guide holes 7 and 8 from their horizontal portions 7a and 8a to their vertical portions 7b and 8b respectively (see the imaginary lines in FIG. 5).

Figure 2:
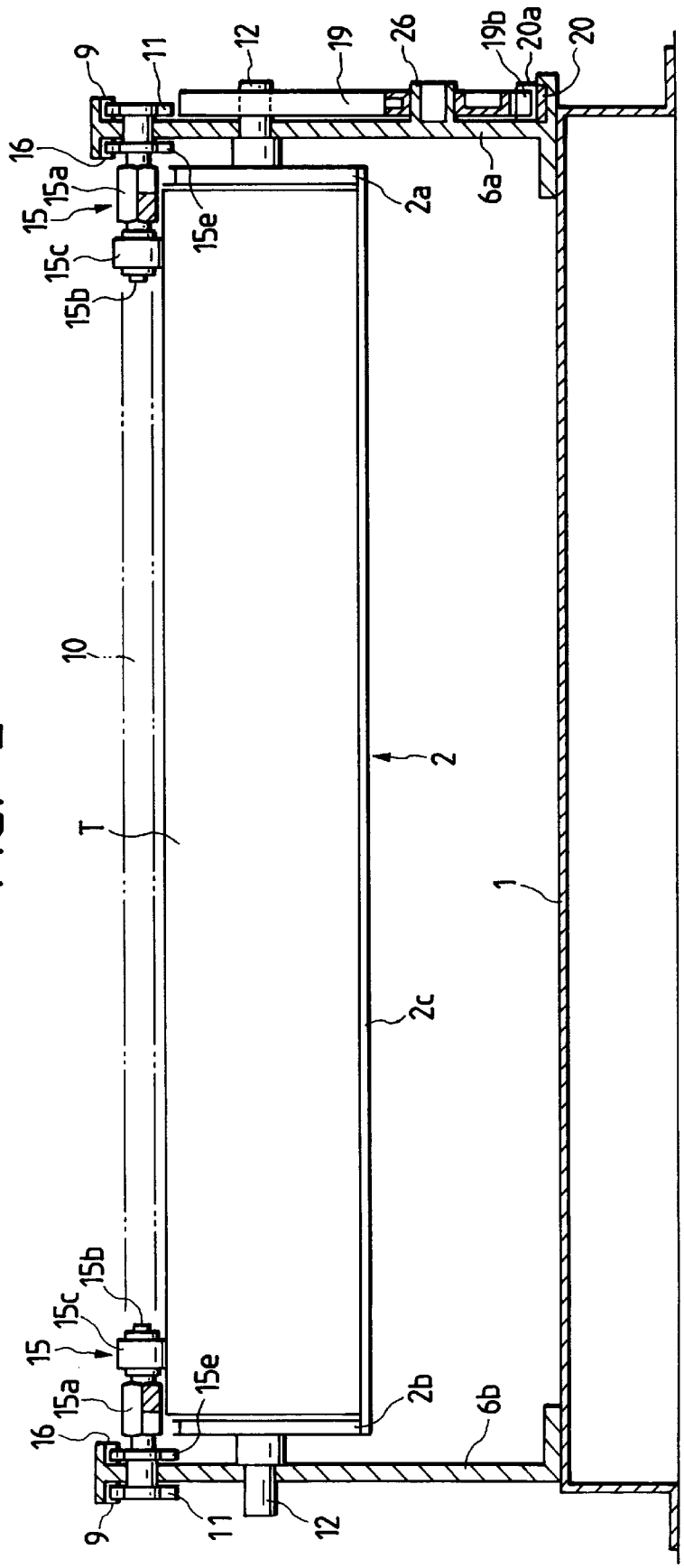
FIG. 2 is a cross-sectional view of the same apparatus.
Figure 3:
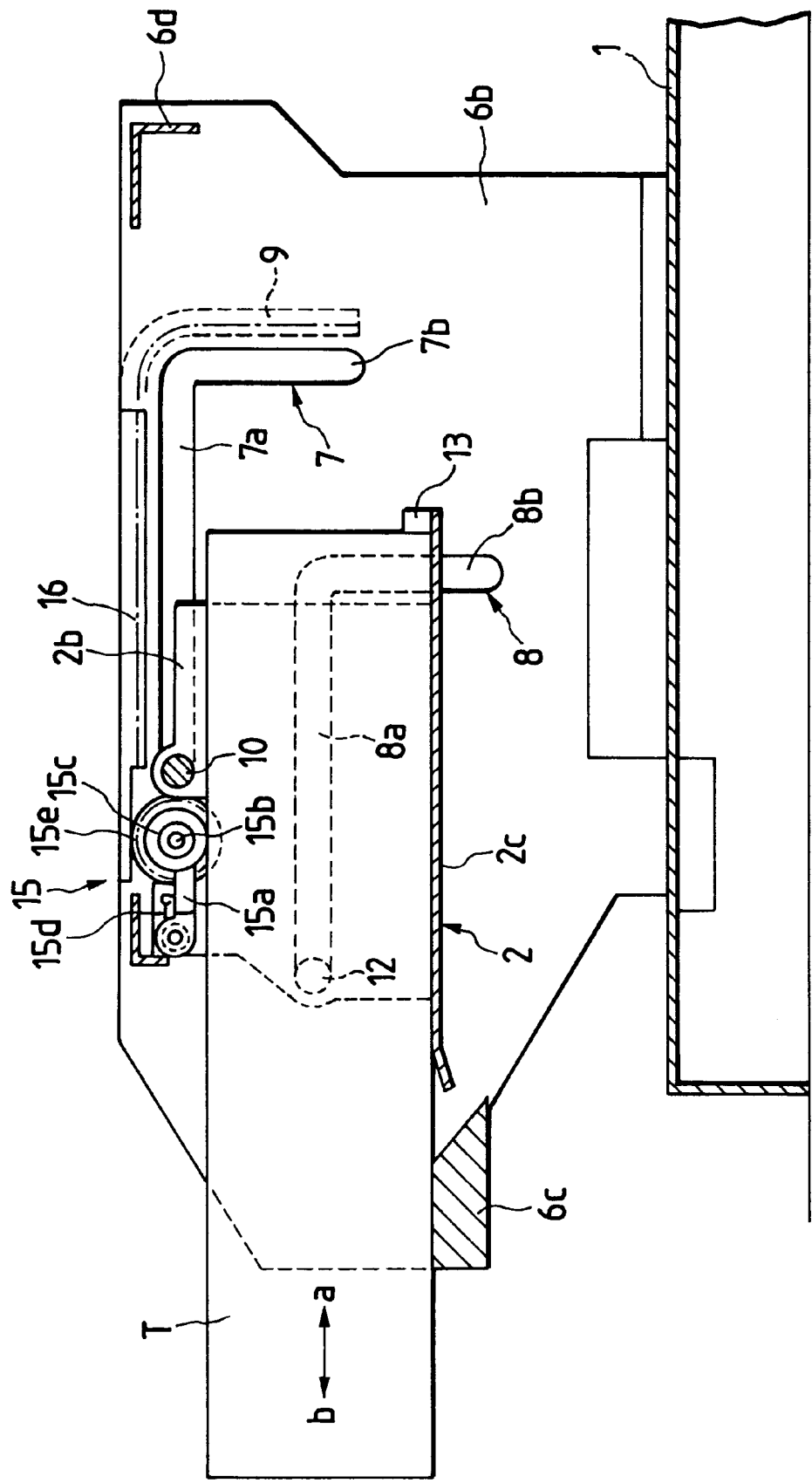
FIG. 3 is a longitudinal sectional view of the same apparatus.

In FIGS. 2 and 3, reference numeral 15 designates a tape cassette pressing member, having a rocking rod 15a pivoted on the upper end portions of the respective side wall portions 2a and 2b of the bearer 2, a pressing roller 15c provided in one end portion of a support shaft 15b supported by the forward end portion of the rocking rod 15a rotatably, a spring 15d for urging the pressing roller 15c downward, and a pinion 15e provided at the other end portion of the support shaft 15b. Racks 16 are provided along the horizontal portions 7a of the upper guide holes 7 in the respective side wall portions 2a and 2b so as to be opposite to the pinion 15e.

In the above-mentioned configuration, as shown in FIG. 3, when the tape cassette T is inserted to the bearer 2, the pressing roller 15c is pushed up against the spring 15d by the tape cassette T, so that the tape cassette T is held by the pressing roller 15c and the bottom wall portion 2c of the bearer 2. When the bearer 2 with the tape cassette T inserted thereon is retreated in the direction of the arrow a in this state, the pinion 15e is geared with the racks 16 so as to drive the pressing roller 15c forward, so that the bearer 2 with the tape cassette T inserted thereon can be retreated in the direction of the arrow a along the guide holes 7 and 8 smoothly. On the contrary, when the bearer 2 with the tape cassette T inserted thereon is advanced in the direction of the arrow b in the state shown in FIG. 5, the pressing roller 15c is driven backward, so that the tape cassette T can be pressed forward largely from the bearer 2 after the bearer 2 with the tape cassette T inserted thereon is advanced in the direction of the arrow b smoothly.

Figure 4:
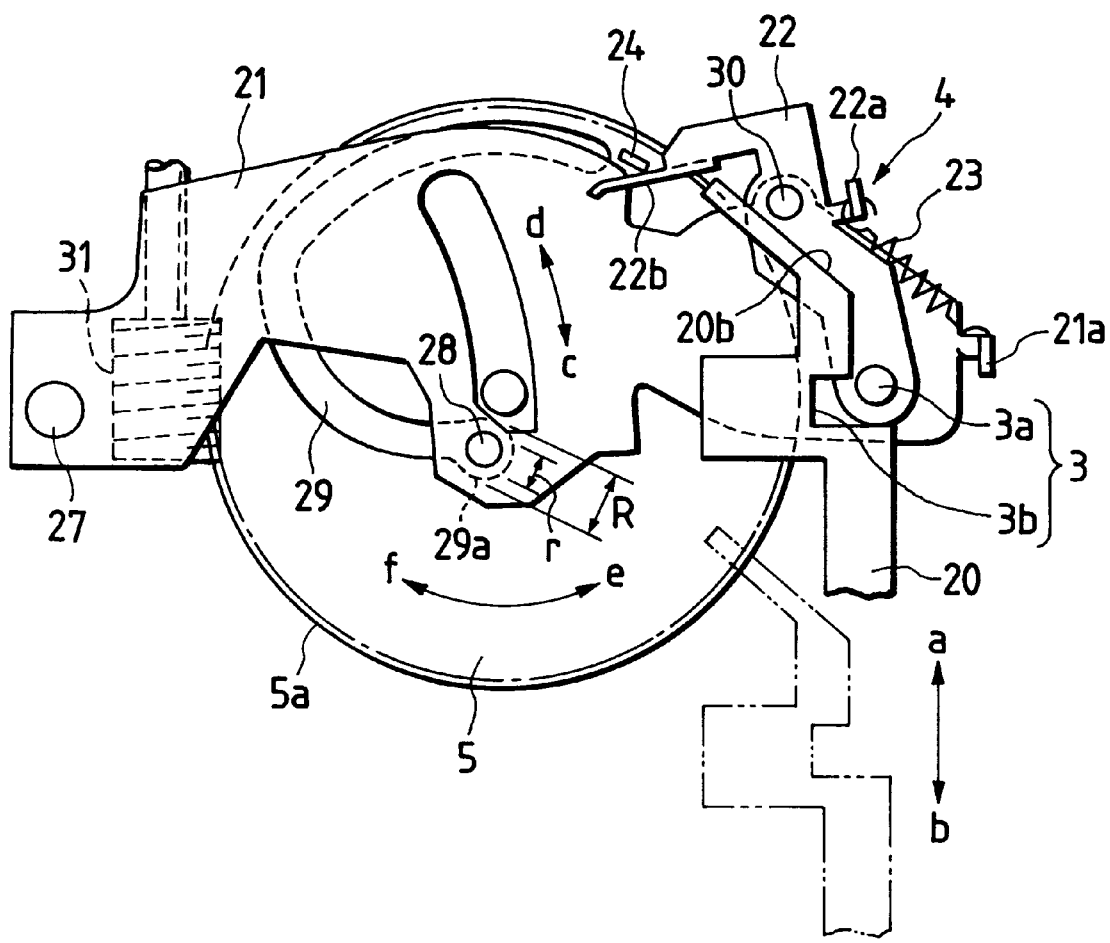
FIG. 4 is a plan view of a main part illustrating the state where a clutch is turned off.

As shown in FIGS. 1, 2 and 4, the interlocking mechanism 4 with the clutch 3 has an interlocking rod 20 interlocking with the bearer 2 through an interlocking lever 19, a rocking lever 21 interlocking with the rotating cam 5, a clutch lever 22 pivoted on the rocking lever 21 rotatably, and a spring 23 for urging the clutch lever. A pressing piece 24 for pressing and rotating the clutch lever 22 against the spring 23 is provided on the rotating cam 5 so as to project therefrom. In addition, the clutch 3 is constituted by a clutch pin 3a provided so as to project on the clutch lever 22 and a recess portion 3b formed in the interlocking rod 20 facing the clutch pin 3a.

The interlocking lever 19 is rotatably pivoted on a pivot 26 provided on one guide plate 6a so as to project therefrom, and a long hole 19a formed in the forward end portion of the interlocking lever 19 is fitted to the guide pin 12 fitted into the lower guide hole 8, as shown in FIGS. 1 and 2.

As shown in FIGS. 1 and 4, the interlocking rod 20 is disposed so as to be movable in the front-rear direction between the arrows a and b along the one guide plate 6a, and a rack 20a is formed on the forward end portion of the interlocking rod 20 so as to be geared with a pinion 19b of the interlocking lever 19. An inclined guide surface 20b inclined toward the rotating cam 5 is formed backward from the neighborhood of the recess portion 3b which is formed in the rear end portion of the interlocking rod 20.

As shown in FIG. 4, the base portion of the rocking lever 21 is pivoted on the chassis 1 so as to be swingable in the directions of the arrows c and d through a pivot 27, and a cam pin 28 is provided so as to project at the center portion of the rocking lever 21 and fitted into a cam groove 29 of the rotating cam 5. The width R of a start end 29a of the cam groove 29 is set so as to be wider than the diameter r of the cam pin 28, so that the cam pin 28 is movable in the width direction of the cam groove 29 within a range of the start end 29a of the cam groove 29 in a state where the bearer 2 is on standby in the cassette insertion position A.

As shown in FIG. 4, the clutch lever 22 is pivoted on the forward end portion of the rocking lever 21 so as to be swingable through a pivot 30. The clutch lever 22 is urged in the direction to make the clutch pin 3a provided so as to project on the forward end portion of the clutch lever 22 move away from the recess portion 3b, by means of the spring 23 disposed between a protrusion portion 22a provided so as to project on the center portion of the clutch lever 22 and a protrusion portion 21a provided so as to project on the forward end portion of the rocking lever 21. A pressure receiving piece 22b is provided so as to project on the base end portion of the clutch lever 22 facing the pressing piece 24.

In FIG. 4, reference numeral 31 designates a pinion geared with an outer circumferential gear portion 5a of the rotating cam 5. The rotating cam 5 is rotated forward and backward in the directions of the arrows e and f by a driving motor (not shown) through the pinion 31.

In the above-mentioned configuration, when the tape cassette T is inserted to the bearer 2 which is on standby in the cassette insertion position A as shown in FIGS. 1 and 3, the clutch lever 22 is rotated against the spring 23 by the pressing piece 24 to release the clutch pin 3a from the recess portion 3b of the interlocking rod 20 to thereby release the interlocking between the bearer 2 and the rotating cam 5 as shown in FIG. 4. Accordingly, only the interlocking rod 20 is advanced in the direction of the arrow b as shown in FIG. 5, in response to the retreat of the bearer 2 with the tape cassette T inserted thereon to the cassette mount position B in the direction of the arrow a (see the imaginary lines in FIG. 4). Accordingly, it is possible to insert the tape cassette T easily.

Figure 6:
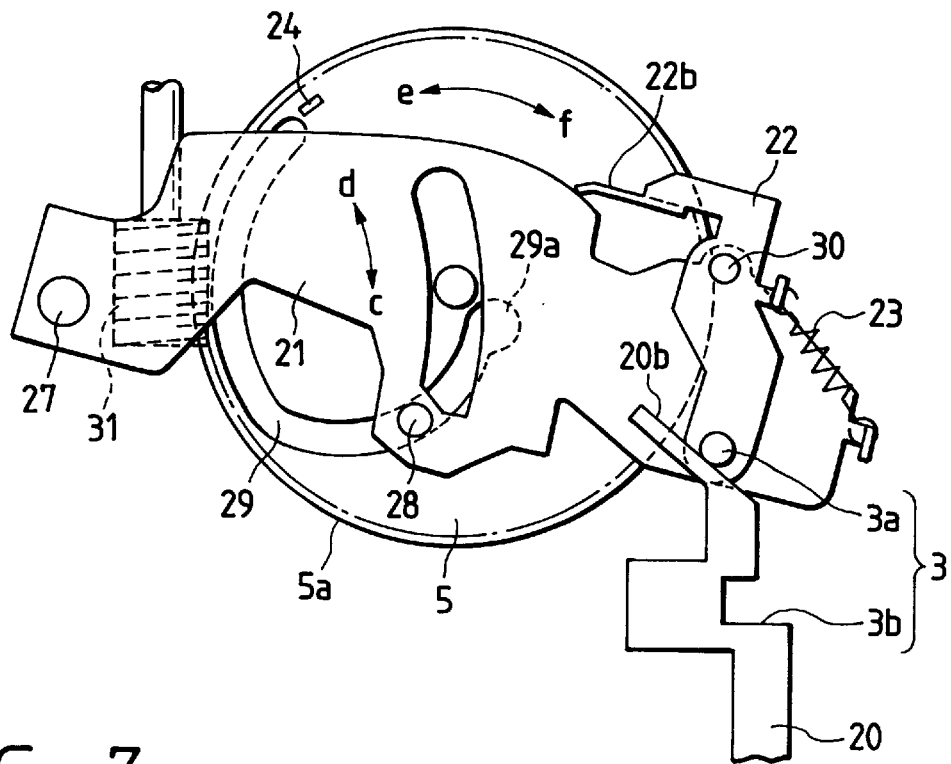
FIG. 6 is a plan view of a main part illustrating the state in the way of turning-on of the clutch.

When the bearer 2 with the tape cassette T inserted thereon is retreated in the direction of the arrow a, the rotating cam 5 is rotated forward in the direction of the arrow e in response to a signal which indicates detection of the state of retreat of the bearer 2, so that the pressing piece 24 is separated from the clutch lever 22 as shown in FIG. 6. Consequently, the clutch pin 3a is brought into contact with the inclined guide surface 20b of the interlocking rod 20 by the spring 23.

Figure 7:
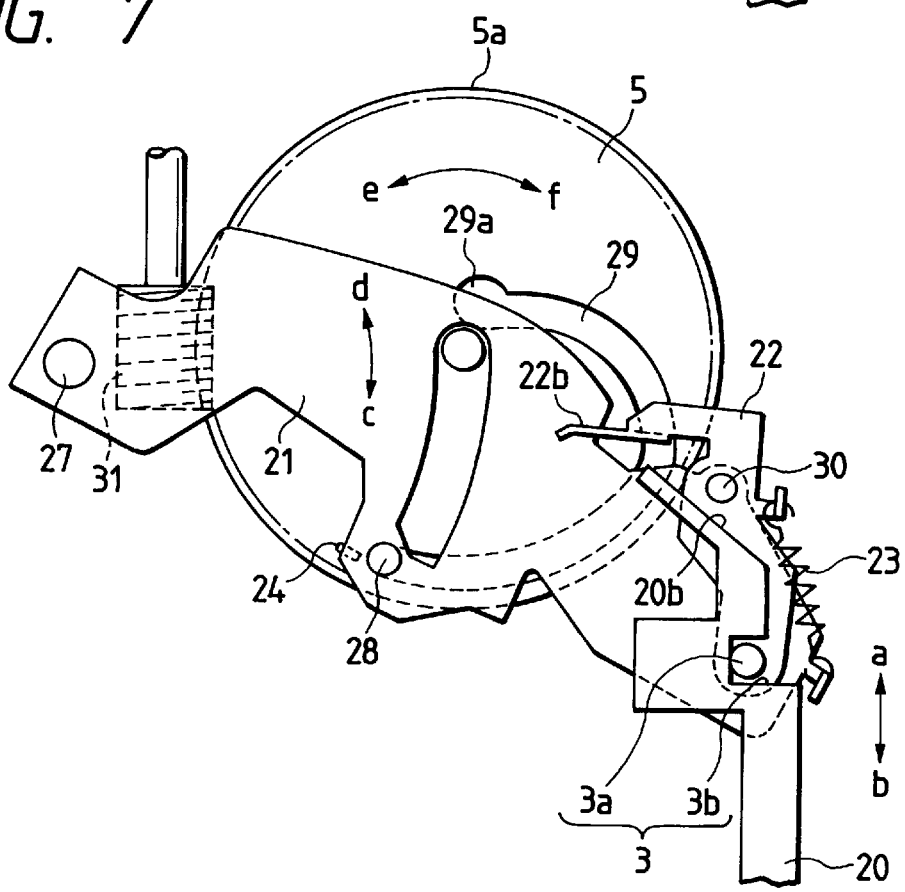

With the rotating cam 5 being rotated forward in the direction of the arrow e, the rocking lever 21 is rocked in the direction of the arrow c through the cam groove 29 and the cam pin 28, so that the clutch pin 3a is fitted to the recess portion 3b as shown in FIG. 7 while the bearer 2 with the tape cassette T inserted thereon is mounted in the cassette mount position B (see the imaginary lines in FIG. 5). Accordingly, the bearer 2 and the rotating cam 5 are interlocked with each other.

Next, when a tape cassette ejecting button (not shown) is pushed, the rotating cam 5 is rotated backward in the direction of the arrow f in response to an ejecting signal generated by the ejecting button, so that the interlocking rod 20 is retreated in the direction of the arrow a by means of the clutch pin 3a. Accordingly, the bearer 2 with the tape cassette T inserted thereon is advanced in the direction of the arrow b to the cassette insertion position A, so that the tape cassette T can be taken out.

When the bearer 2 with the tape cassette T inserted thereon is advanced in the direction of the arrow b to the cassette insertion position A (see FIGS. 1 and 3), the pressure receiving piece 22b is pressed by the pressing piece 24 to thereby rotate the clutch lever 22 against the spring 23, as shown in FIG. 4. Consequently, the clutch pin 3a is separated from the recess portion 3b to thereby release the interlocking between the bearer 2 and the rotating cam 5. Then, the clutch pin 3a is pressed onto the inside surface of the recess portion 3b, and the cam pin 28 fitted into the start end 29a of the cam groove 29 is moved in the width direction of the cam groove 29 by the pressing force, so that the rocking lever 21 is rocked in the direction of the arrow c. Accordingly, the pressing force is reduced, so that it is possible to remove the clutch pin 3a from the recess portion 3b easily.

According to the above-mentioned configuration, when the tape cassette T is inserted to the bearer 2 which is on standby in the cassette insertion position A, the clutch 3 is turned off. Accordingly, not only it is possible to insert the tape cassette T easily, but also there is no fear that interior parts engaging with the interlocking mechanism 4 are damaged even if the insertion of the tape cassette T is performed in the off-state of the power supply.

In addition, the configuration of the interlocking mechanism 4 with the clutch 3 is comparatively simple. Therefore, the manufacturing cost is low, and the clutch 3 can be switched surely.

According to the present invention, the clutch is turned off to release the interlocking mechanism between the bearer and the rotating cam when the tape cassette is inserted to the bearer which is on standby in the cassette insertion position. Accordingly, not only it is possible to insert the tape cassette easily, but also there is no fear that interior parts engaging with the interlocking mechanism are damaged even if the insertion of the tape cassette is performed in the off-state of the power supply.

What is claimed is:

1. A magnetic tape apparatus comprising:

a bearer formed so as to be reciprocatable in a front-rear direction between a cassette insertion position and a cassette mount position on a chassis for inserting a tape cassette in a magnetic tape apparatus; and a rotating cam provided on said chassis for driving said bearer through an interlocking mechanism with a clutch, wherein said clutch is turned off to release an interlocking mechanism between said bearer and said rotating cam when said bearer is advanced from said cassette mount position to said cassette insertion position, while said clutch is turned on to establish an interlock between said bearer and said rotating cam when said bearer is retreated from said cassette insertion position to said cassette mount position; and wherein said interlocking mechanism and clutch comprise an interlocking rod interlocking with said bearer, a rocking lever interlocking with said rotating cam, a clutch lever rotatably pivoted on said rocking lever, and a spring biasing said clutch lever, wherein said clutch having a clutch pin provided on said clutch lever so as to project therefrom, and a recess portion formed in said interlocking rod in opposition to said clutch pin, a pressing piece for pressing said clutch lever to rotate against said spring provided on said rotating cam so as to project therefrom, and said clutch lever is pressed to rotate against said spring by the pressing piece to thereby release the clutch pin from the recess portion when said bearer is advanced from the cassette mount position to the cassette insertion position, while said clutch lever is rotated by said spring to thereby make the clutch pin fit into the recess portion when said bearer is retreated from the cassette insertion position to the cassette mount position.

2. The magnetic tape apparatus according to claim 1, wherein a cam pin provided on said rocking lever projecting therefrom is fitted into a cam groove of said rotating cam, and a width of a start end of the cam groove is set so as to be wider than a diameter of the cam pin, so that the cam pin can move in a width direction of the cam groove in the start end of the cam groove while said bearer is on standby in the cassette insertion position.

3. The magnetic tape apparatus according to claim 1, wherein said clutch lever is pivoted on a forward end portion of said rocking lever so as to be swingable through a pivot, said spring disposed between a protrusion portion provided so as to project on a center portion of said clutch lever and a protrusion portion provided so as to project on the forward end portion of said rocking lever, and said clutch lever being urged in a direction to make said clutch pin provided so as to project on the forward end portion of said clutch lever move away from the recess portion by means of said spring, and a pressure receiving piece is provided so as to project on a base end portion of said clutch lever facing the pressing piece.

* * * * *